United States Patent [19]

Peveraro

[11] 3,876,140
[45] Apr. 8, 1975

[54] LEVEL-CROSSING FOR CARRYING A TRACKED VEHICLE ACROSS A ROADWAY

[75] Inventor: Cesare Peveraro, Bergamo, Italy

[73] Assignee: Societa Per La Strada Guidata S.r.l., Milan, Italy

[22] Filed: Mar. 7, 1974

[21] Appl. No.: 449,081

[30] Foreign Application Priority Data
Mar. 21, 1973 Italy .................. 9389/73

[52] U.S. Cl. .............................. 238/10 R
[51] Int. Cl. .............................. E01b 5/02
[58] Field of Search ........ 238/8, 10 R, 12; 246/377, 246/375, 465, 466, 472

[56] References Cited
UNITED STATES PATENTS
2,952,411 9/1960 Hand ......................... 238/10 R
3,630,439 12/1971 Cook ......................... 238/10 R Primary Examiner—Lloyd L. King
Assistant Examiner—Richard A. Bertsch
Attorney, Agent, or Firm—Hopgood, Calimafde, Kalil, Blaustein & Lieberman

[57] ABSTRACT

A level-crossing for carrying a tracked vehicle across a roadway comprises a pivotal guide rail movable between an operative position in which it extends across the roadway to permit passage of a tracked vehicle, and an inoperative position to permit passage of a road-going vehicle. Locking means are provided to releasably lock the rail in its operative position. The rail is preferably pivotal about a horizontal or a vertical axis.

5 Claims, 12 Drawing Figures

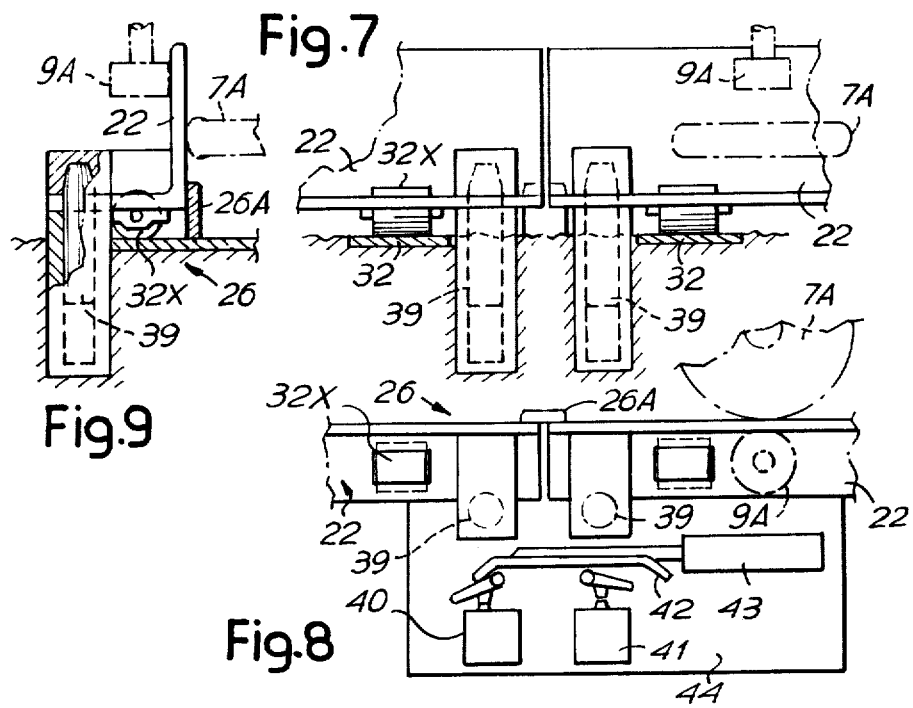
Fig.7
Fig.9
Fig.8
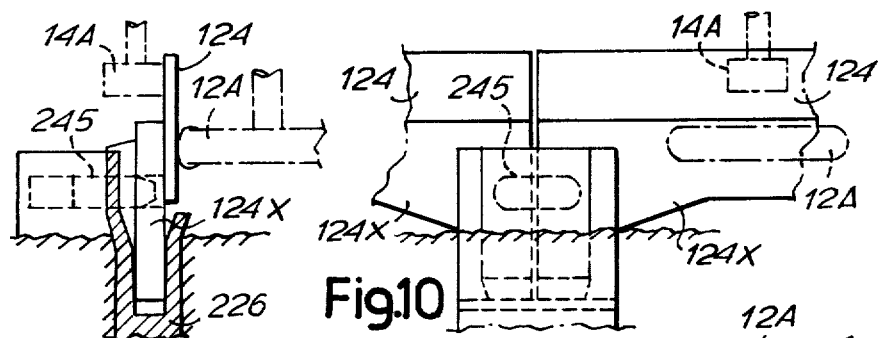
Fig.12
Fig.10
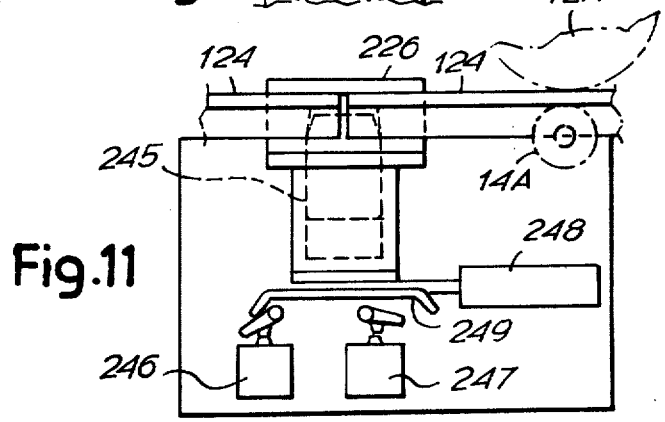
Fig.11

LEVEL-CROSSING FOR CARRYING A TRACKED VEHICLE ACROSS A ROADWAY

BACKGROUND OF THE INVENTION

1. Field of the Invention.

The present invention relates to tracked vehicle systems, and more particularly to a level-crossing for carrying a tracked vehicle across a roadway.

2. Description of the Prior Art.

There has been proposed a tracked vehicle system in which vehicles having driven, rubber-tired, wheels are guided by means of wheels or rollers rotatable about vertical axes. The guiding function is selectively provided by engagement of certain of these wheels or rollers with the opposed inner side surfaces of guide rails located at each side of the vehicle, or with the inner and outer side surfaces of a rail at one side of the vehicle.

A level-crossing for such a tracked vehicle system has been described in Italian Pat. Specification No. 906,480.

SUMMARY OF THE INVENTION

According to the present invention, there is provided in a level-crossing for carrying a tracked vehicle across a roadway, a movable structure having inner and outer side walls for guiding a tracked vehicle, said structure being mounted for angular movement between an operative position in which the structure extends across the roadway whereby to permit passage of a tracked vehicle, and an inoperative position to permit passage of a road-going vehicle, and means operative to releasably retain the structure in its operative position.

BRIEF DESCRIPTION OF THE DRAWINGS

Embodiments of the invention will now be described, by way of example only, with reference to the accompanying diagrammatic drawings in which:

FIGS. 7, 8, 9 show a locking device of the level-crossing of FIG. 1, respectively in side elevation, end elevation, and plan view; and FIGS. 10, 11, 12 are views corresponding to FIGS. 7, 8 and 9 respectively of a locking device of the level-crossing shown in FIG. 4.

DESCRIPTION OF THE PREFERRED EMBODIMENTS

Figure 1:
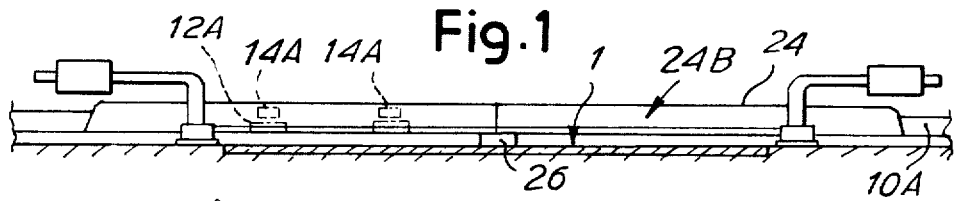
FIG. 1 is a side elevation of one embodiment of a level-crossing in accordance with the present invention.
Figure 2:
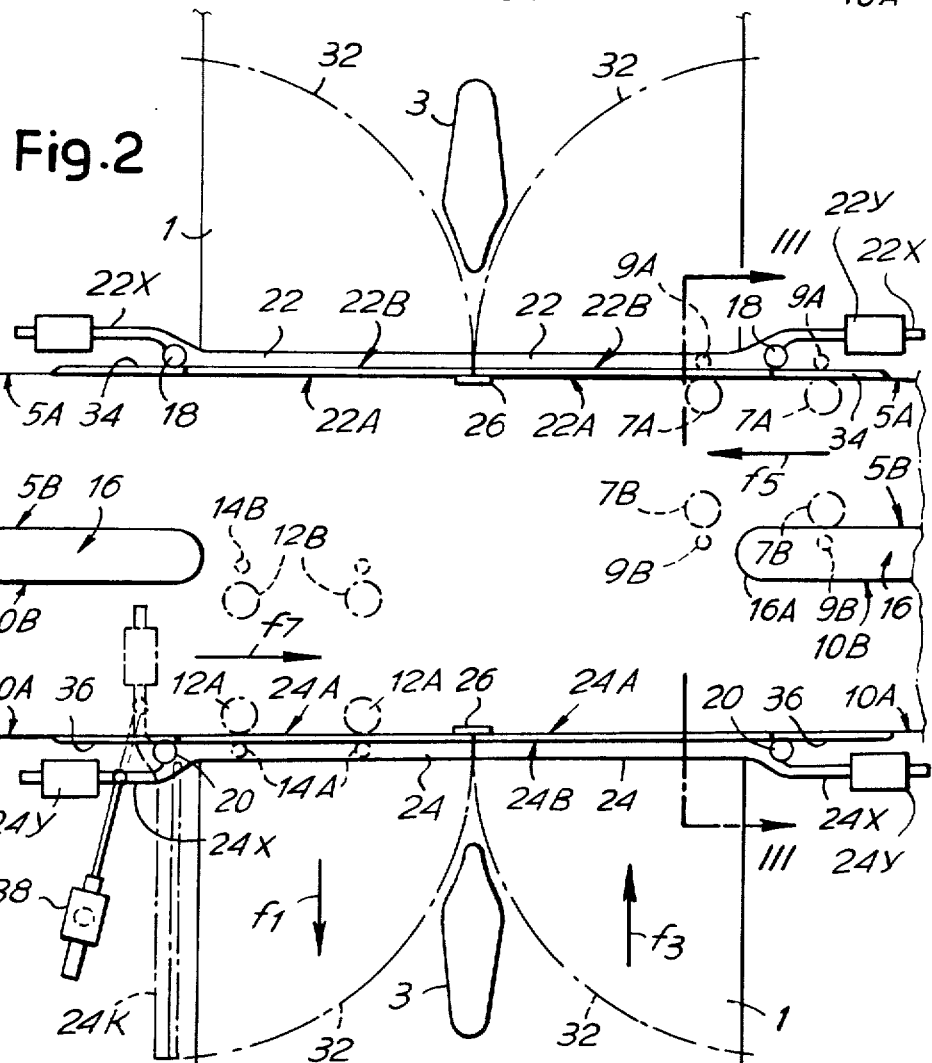
FIG. 2 is a plan view of the level-crossing.
Figure 3:
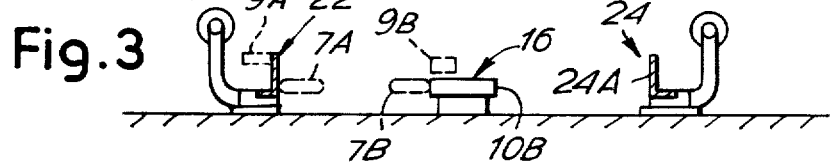
FIG. 3 is a section taken on line III—III of FIG. 2.

There is shown in FIGS. 1 to 3, a level-crossing for a roadway or highway 1 along which traffic travels in the directions indicated by the arrows $f_1$, $f_3$. A respective partition 3 for separating the opposite flows of traffic is arranged on the roadway 1 adjacent to the level-crossing on each side of the same. The partitions 3 also serve to protect locking devices of the crossing, as will be described hereinafter.

The level-crossing is associated with a double track of a tracked vehicle system of the type referred to above. In the figures, 5A and 5B denote the inner side walls of a first track along which a vehicle can travel in the direction of arrow $f_5$. The vehicle has lateral drive wheels 7A and 7B which are rotatable about a vertical axis and which cooperate with the side walls 5A and 5B respectively. Outer guide wheels 9A and 9B are associated with the wheels 7A and 7B respectively and are located above the level of these wheels.

The second track, along which a vehicle can travel in the direction of the arrow $f_7$, has inner side walls 10A and 10B which are engaged by inner lateral drive wheels 12A and 12B respectively of the vehicle. The vehicle has outer drive wheels 14A and 14B associated with the wheels 12A and 12B respectively.

The side walls 5B and 10B are defined by opposite sides of a central projecting structure 16. The structure 16 is interrupted in the zone of the level-crossing so that passage of the traffic along the roadway is not obstructed. Therefore the wheels 7B and 12B cannot act to guide the respective vehicles in the zone of the level-crossing. The side walls 5A and 10A are also interrupted in the zone of the crossing and are replaced by moving rails which, when located in an operative position, define side walls in alignment with the walls 5A and 10A. Whilst a tracked vehicle is moving across the crossing, it is guided by engagement of the wheels 7A, 9A, or 12A, 14A with the movable rails, the wheels 9A and 14A engaging the outer side wall of the movable rails at a higher level than that at which the wheels 7A and 12A engage the inner side wall. The movable rails are moved into their operative positions when the roadway is barred to allow the transit of the tracked vehicles across the level-crossing. When each vehicle reaches the end portion 16A of the structure 16 it is guided by the wheels 7A, 7B, 9A or 12A, 12B, 14B whereby to permit positive guidance at all times during transference of the guide function from the inner side walls 5A, 5B, or 10A, 10B to the inner and outer side walls of the movable rails.

As shown in the drawings, each movable rail is formed by means of two channel-sectioned structures 22 or 24, each structure 22, 24 being pivotal about a vertical axis 18 and 20 respectively, between an operative position in which the rails are aligned with the side walls 5A and 10A and extend transversely to the roadway 1, and an inoperative position in which the structures extend parallel to the sides of the road 1, as indicated by 24K in FIG. 2 for one of the structures 24. Such movement takes place in a substantially horizontal plane.

When the structures 22, 24 are located in their operative positions they must be firmly locked to support the lateral thrust imposed by the tracked vehicles. For this purpose, for each pair of structures there is provided a locking device generally indicated by 26 in FIGS. 1 and 2; the locking device 26 will be described in greater detail hereinafter. The partitions 3 are shaped in such a manner as to permit the pivotal movement of the structures 22, 24 the zone of such movement being indicated by broken lines 32; the partitions 3 are also of such a shape and size to protect the locking devices 26 from damage by road-going vehicles moving on the roadway 1. The lines 32 also indicate a track for supporting rollers 32X of the structures 22 and 24. The two movable rails formed by the structures 22 and 24, have inner side walls 22A, 24A arranged to cooperate with the inner wheels 7A and 12A respectively, and two outer side walls 22B and 24B arranged to cooperate with the outer wheels 9A and 14A respectively. The side walls 22A and 22B, or at least the side wall 22B, are aligned in the operative position with fixed rails 34 which are provided at each end portion of the side walls 5A to cooperate with the rollers 9A when the rollers 7B reach the end portion of the side wall 5B. Similarly fixed rails 36 are provided in alignment with the side wall 10A to cooperate with the rollers 14A when the rollers 12B reach the end portion of the side wall 10B. The side walls 34, 36 permit transference of the guiding function from the wheels 7A, 7B, and 12A, 12B, to the wheels 7A, 9A, and 12A, 14A. The side walls 34 and 36 are located laterally outside of the roadway 1, and are positioned adjacent the pivots 18 and 20 to permit exact alignment with the side walls 22A, 22B, and 24A, 24B.

An extension 22X, 24X of each structure 22, 24 beyond its pivot 18, 20 forms a counterbalance arm provided with counterbalancing weights 22Y and 24Y, appropriately adjusted to balance the weight of the structure about its pivot.

The arms 22X, 24X are shaped to lie above the level of the side walls 34 and 36.

A device 38 is linked to each of the arms 22X, 24X, in order to pivot the respective structure 22, 24 between its operative and inoperative position.

As shown in FIGS. 7, 8, and 9, each locking device 26, includes two latches 39 which serve to stop, against a limit switch 26A, the two movable structures forming each movable rail in such a manner that the two sections of each movable rail are aligned.

The locking device also includes electric control means which determines - at the correct moment - the lowering or the raising and locking of the latches 39. The control means can comprise a solenoid 43 (or a small electric motor) which effects movement of a yoke 42; by means of this movement either a control contact of a relay 40 is closed, or a contact of a relay 41 is closed. These components are frequently employed in known devices for automatically opening and closing gates for drives and the like, and will not be described in detail, such devices being actuated by a photoelectric cell in response to a tuned signal from an automobile.

When the relay 40 is in a closed condition, the latches 39 are raised into the lock position and the level-crossing is closed to road traffic. The opening and closing operation of the level-crossing can be effected by using a conventional electric contact-type controller.

In order to open the level-crossing, the solenoid 43 is actuated so that the yoke 42 is urged towards the left (as viewed in FIG. 7) to such an extent that the relay 40 is closed. Closing of the relay 41 causes the two latches 39 to be lowered whereby to permit movement of the structures 22, 24; the devices 38 are then actuated to pivot the respective structures 22, 24 through 90° about their respective pivots into their inoperative positions and are retained therein by the devices 38.

In order to close the level-crossing, the devices 38 are actuated in the reverse direction to pivot the structures 22, 24 against the stops 26A, the speed of the structures being insufficient to cause re-bounding of the structures from the stops 26A. Then the solenoid 43 is energized to urge the yoke 42 to the right so that the relay 41 is opened, and the relay 40 is closed whereby to raise the latches 39 and thus to lock the structures 22, 24 in their operative positions.

Raising and lowering means for the latches 39, the relays 40 and 41, and the solenoid 43 and the associated yoke are located in a box 44 which is arranged beneath the road surface.

Figure 4:
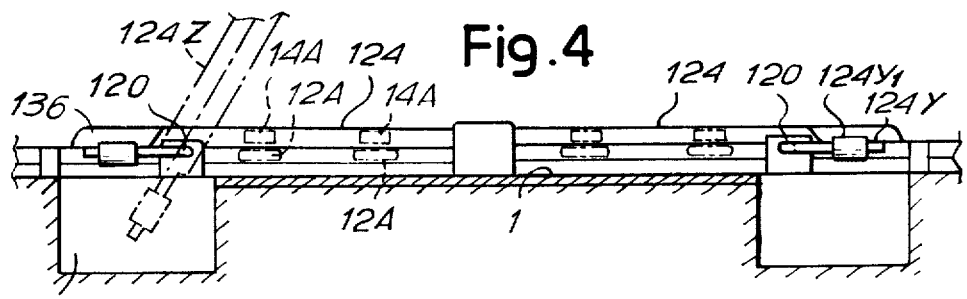
FIG. 4 is a side elevation of a modified form of level-crossing.
Figure 5:
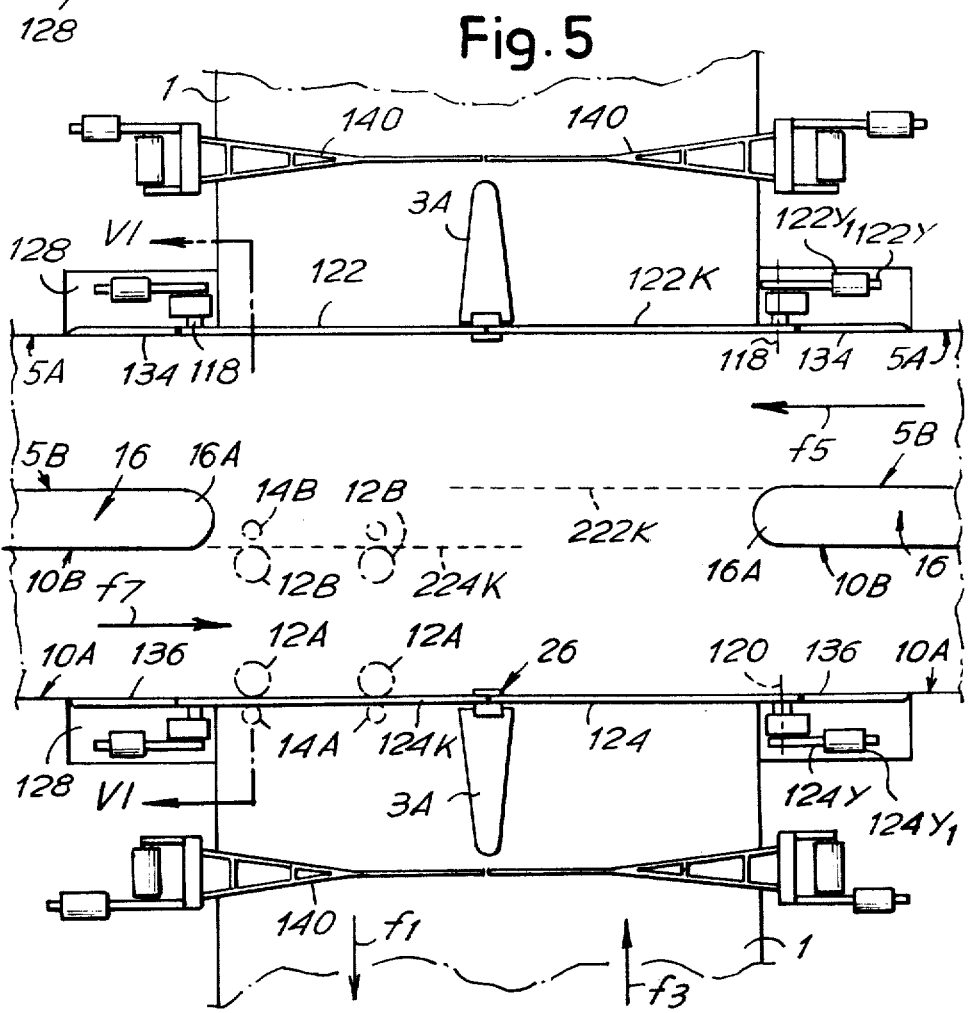
FIG. 5 is a plan view of the level-crossing shown in FIG. 4.
Figure 6:
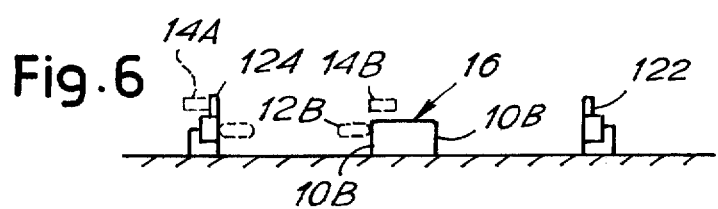
FIG. 6 is a section taken on line VI—VI of FIG. 5.

In the embodiment shown in FIGS. 4, 5 and 6, each movable rail is defined by two structures 122 and 124 which are pivotal about respective horizontal axes 118, 120 between raised inoperative positions (as shown at 124Z for one structure 124 in FIG. 4) and horizontal operative positions.

The structures 122 and 124 form inner side walls for the wheels 7B and 12A, and outer side walls for the wheels 9B and 14A and have counterbalancing arms 122Y and 124Y which carry adjustable counterbalance weights $122Y_1$ and $124Y_1$ which serve to balance the structures about the respective pivots so as to facilitate their movement. Suitable housings 128 are provided in the ground to receive the arms and their associated counterbalance weights.

Fixed side walls 134 and 136, which act in a similar manner to the walls 34, 36 are positioned adjacent the pivots 118 and 120.

The structures 122, 124 of FIGS. 4 to 6 thus cooperate with the wheels of a tracked vehicle crossing the level-crossing in a similar manner to that of the structures 22, 24 whereby the vehicle is always guided on the same side when on the crossing (as illustrated, the right-hand side). It is possible, however, for the side wall 10A to be extended by a section 124K which extends beyond the central portion of the crossing (as designated by the position of traffic partitions 3A similar to the partitions 3) while the opposite side wall 10B is extended by a section 224K, the two sections 124K and 224K being partly overlapped to permit transference of the guide function from the left-hand side with the section 224K to the right-hand side with the section 124. Similarly the side walls 5A and 5B can be extended by a section 122K and a section 222K respectively.

In each of the described embodiments, there are provided gates in the form of bars 140 (FIG. 5) for blocking the roadway when the structures 22, 24 or 122, 124 (or 222, 224) are in their operative positions. The bars 140 can be moved simultaneously with the structures.

The structures 122 and 124 can be raised and lowered by means of mechanisms similar to those for raising and lowering conventional railway level-crossing gates. The structures are lowered at such a speed that oscillations in a vertical plane are dampened. When the structures are located in their operative positions the lower edge portion of their inner end portions as 124X are located in U-sectioned stops 226 (FIG. 12) whereby horizontal movement of the structures is prevented.

The structures 122, 124 are lockable in their operative positions by means of horizontally movable latches 245 which move simultaneously to engage the aforesaid lower edge portions of the structures.

Preferably the latches are actuated in a similar manner to that of the previous embodiment. More particularly, two relays 246 and 247 are actuated by a solenoid 248 (or by a small electric motor), via a movable yoke 249. When the structures are in their operative positions to permit passage of a tracked vehicle, the relay 246 is closed, and the latches 245 lock the structures against upwards movement.

In order to raise the structures to permit passage of road-going vehicles, the solenoid 248 urges the yoke 249 toward the left (as viewed in FIG. 11) until the relay 246 is opened and the relay 247 is closed. The relay 247, upon being closed, withdraws the latches 245 thus releasing the structures to permit them to be raised into their inoperative positions. When the structures are next lowered into their operative positions, the solenoid 248 is actuated to move the yoke 249 to the right (as viewed in FIG. 11) whereby to open the relay 247 and to close the relay 246; the latter causes the latches 245 to lock the structures as shown in FIGS. 10 to 12.

What is claimed is:

1. In a level-crossing for carrying a tracked vehicle across a roadway,
   a movable structure having inner and outer side walls for guiding a tracked vehicle, said structure being mounted for angular movement between an operative position in which the structure extends across the roadway whereby to permit passage of a tracked vehicle, and an inoperative position to permit passage of a road-going vehicle,
   means operative to releaseably retain the structure in its operative position,
   said retaining means comprising stop means operative to define the operative position of the structure, and
   releasable latch means operative to lock the structure in its operative position whereby to prevent movement into its inoperative position.

2. A level-crossing according to claim 1, wherein the structure is mounted for movement about a horizontal axis parallel to the roadway whereby the structure is movable in a vertical plane between a raised inoperative position and a lowered operative position.

3. A level-crossing according to claim 1, wherein the structure is mounted for movement about a vertical axis whereby the structure is movable horizontally between its operative position and its inoperative position in which it lies at a side of the roadway.

4. A level-crossing according to claim 1 further comprising
   separator means for traffic on the roadway, and
   a second said movable structure, each said structure having an end portion located adjacent the separator means when the structures are located in their operative positions, said retaining means being positioned adjacent said separator means.

5. In a level-crossing for carrying a tracked vehicle across a roadway,
   a movable structure having inner and outer side walls for guiding a tracked vehicle, said structure being mounted for angular movement between an operative position in which the structure extends across the roadway whereby to permit passage of a tracked vehicle, and an inoperative position to permit passage of a road-going vehicle,
   means operative to releasably retain the structure in its operative position,
   separator means for traffic on the roadway, and
   a second said movable structure, each said structure having an end portion located adjacent the separator means when the structures are located in their operative positions, said retaining means being positioned adjacent said separator means.

* * * * *